United States Patent [19]

Hessabi

[11] Patent Number: 5,305,584
[45] Date of Patent: Apr. 26, 1994

[54] MANUALLY OPERATED CUTTING AND DETACHMENT DEVICE

[76] Inventor: Iradj Hessabi, Breitenkamp 59, D-4811 Oerlinghausen, Fed. Rep. of Germany

[21] Appl. No.: 916,844

[22] PCT Filed: Dec. 11, 1991

[86] PCT No.: PCT/EP91/02372

§ 371 Date: Aug. 14, 1992

§ 102(e) Date: Aug. 14, 1992

[87] PCT Pub. No.: WO92/10091

PCT Pub. Date: Jun. 25, 1992

[30] Foreign Application Priority Data

Dec. 11, 1990 [DE] Fed. Rep. of Germany ....... 4039458
Dec. 11, 1990 [DE] Fed. Rep. of Germany ....... 4039460

[51] Int. Cl.5 .............................................. A01M 21/04
[52] U.S. Cl. ........................................ 56/1; 47/1.01; 126/271.1
[58] Field of Search .................... 56/1, 12.2, DIG. 23; 47/1.01, 1.44, 1.301; 126/271.1

[56] References Cited

U.S. PATENT DOCUMENTS

| | | | |
|---|---|---|---|
| 3,183,650 | 4/1963 | Ferris | 56/10.1 |
| 3,559,337 | 2/1971 | Marcoux et al. | 126/271.1 X |
| 3,945,370 | 3/1976 | Essington | 126/271.1 X |
| 4,094,095 | 6/1978 | Dykes | 126/271.1 X |

FOREIGN PATENT DOCUMENTS 3016145 10/1981 Fed. Rep. of Germany.

Primary Examiner—David J. Bagnell
Attorney, Agent, or Firm—Browdy and Neimark

[57] ABSTRACT

A manually operated cutting and detachment device for weed and moss removal which has a rod-shaped manual holder and a heat conductor. The heat conductor is engaged on a heat conductor mount. The heat conductor mount is disposed, with a first spring interspersed on a connecting mount for compensating the expansion difference of said heat conductor at varying temperature. The connecting part with the heat conductor mounted and the heat conductor thereon are separably and interchangeably engaged to a first end of said rod-shaped manual holder. The electrical means is engaged on the second end of the rod-shapen manual holder for generating electricity for resistance heating of the heat conductor.

7 Claims, 7 Drawing Sheets

MANUALLY OPERATED CUTTING AND DETACHMENT DEVICE

TECHNICAL FIELD OF THE INVENTION

The invention relates to an implement for mowing lawns, cutting and detaching moss and weeds and comminution of mown and cut materials of the most various types.

BACKGROUND OF THE INVENTION

Known propelled lawn mowers have respectively an internal combustion or electric motor for driving the cutting arrangement, which drives at least one rotating or oscillating horizontally moving blade. The latter makes a loud noise; for this reason the times for using lawn mowers in residential areas are limited. Because of the large throwing range of their cutters, engine-driven lawn mowers are also dangerous. In most cases the material to be cut is pulled through the rotating or oscillating horizontally moving blades, is crushed in the process and often is not cleanly cut, i.e. not evenly and at varying cutting height, particularly because the blades are subject to great wear and their sharpness decreases. Re-grinding of the blades is often required and takes much time. In addition, engine-driven lawn mowers have undesirably great weight.

Chemical and/or mechanical means are used for removing weeds between or on flagstones, paving blocks and garden areas. The known chemicals for moss and weed killing pose a danger to the environment because of their penetration into the groundwater.

Mechanical weed removal devices, such as knives and wire brushes, damage and scratch the edges of the flagstones or paving blocks. In addition, they are clumsy and their use is time-consuming.

Compacting devices for cut and mown materials are known in the form of compressing and/or packing devices. They are attached in the form of packing/baling devices in such a way that baling of the mown materials becomes a complicated process. If a reduction of the volume and weight of the mown materials is also required, it can be accomplished with auxiliary devices only with great expenditures in energy and cost and with loud noise.

In city areas, cut mown materials are hauled away and placed in landfills in the form of garbage at great cost. In cities where biodegradable garbage is collected, only a portion of the cost for its removal by composting means can be recovered by the use of the compost. Carrying the cut mown materials to the trash container is not easy, and the cut materials take up a large amount of space in it.

SUMMARY AND OBJECTIVES OF THE INVENTION

It is the object of the invention to provide an implement by means of which lawn mowing, cutting and removal of moss and weeds and comminution of cut and mown materials becomes possible in a simple, easy and silent way and in a safe and environmentally beneficial manner by simple means.

This object is attained in accordance with the invention by these gardening implements which operate with at least one electrical heat conductor as a cutting, burning and comminuting tool.

It is furthermore an object of the invention to embody the gardening implement as a lawn mower which, along with a relatively simple construction, results in improved safety and improved mowing quality without a need for maintenance, as well as a high degree of quietness.

A further object of the invention in connection with the gardening implement is its embodiment as a weed killer, which can be operated in an ecologically compatible and economical manner, along with a very simple design of the implement and easy and safe handling.

Finally, it is the object of the invention to disclose a gardening implement which is simply constructed and easy to handle, which operates with little noise and which comminutes the cut and mown materials into a small volume and weight in a safe and environmentally compatible manner.

The gardening implement in accordance with the invention makes possible the simple, safe, easy-to-handle mowing of lawns, killing of moss and weeds and comminution of mown and cut materials in a low-noise and environmentally compatible manner by means of one or a plurality of electrical heat conductors in the form of wires or grids as cutting, burning and comminuting tools.

The lawn mower cuts the grass with at least one electrically heated wire or rod, where the heat conductor is fastened parallel to the ground on an undercarriage by means of a mount and performs a lateral horizontal movement during the travel of the lawn mower. The expansion difference of the heat conductor at various working temperatures is compensated by its mount, which is connected to a spring, or by the disposition of a resilient heat conductor mount, so that it is continuously stretched. Offset toward the front, a vaned wheel as a feeding and conveying means for the materials to be mowed or for the cut, mown materials is disposed parallel to the heat conductor. It consists of several compartments and is rotatably seated on the undercarriage and connected with the undercarriage by means of a belt drive.

The heat conductor is located a short distance from the passing vane edges of the individual compartments. During travel the vaned wheel moves in such a way that it brings the materials to be mowed and contained in the respective compartments to the heat conductor.

The burning-cutting tool is protected against entering foreign bodies and flying rocks by a parallel grating. The heat conductor is given an axial movement by a cam plate, preferably wave-shaped, which is drivably connected with the undercarriage. The movement of the heat conductor crosswise to the forward movement of the lawn mower is advantageous for more rapid cutting and satisfactory use of the heat of the heating wire.

Operation of the heat conductor does not create noise audible to the human ear; therefore operation is indicated by a safety light. The lawn mower is built on a movable frame with wheels, which are given movement by an engine drive or pushed by the user. The electrically operated heat conductor cuts off the vegetation at a set height when the lawn mower is pushed forward. The cut-off parts can be conveyed into a catcher disposed downstream by their own weight and/or the force of a feed device, for example a conveyor belt. The vaned wheel and, if applicable, the conveyor belt are driven during the forward movement of the lawn mower either directly by an engine drive or by the forward movement via the undercarriage. In an advantageous manner the cutting height can be set manually by means of a lever connected with the heating wire mount. The height of the heat conductor can be adjusted by means of it.

The heat conductor is very easy to exchange and is advantageously connected with a transformer and/or a battery via an electrical connection and a switch.

The cutting and detaching device for moss and weed removal consists of an electrical heat conductor, which is advantageously circular and is flexibly disposed at the lower end of a manually guided rod. On its upper end the rod has an electrical connection and a handle and switch, if desired a removable transformer or a battery, if this is not placed upstream of the electrical connection.

After the circular heat conductor has been placed around the weed or the plant, the current supply is turned on. When displacing the heat conductor close to the ground, it cuts off the undesired plants ahead of itself at the place it touches them. The height or depth of the cut can be freely selected by the user. Further in-depth working of the joints between the flagstones or paving blocks is easily possible because of the small thickness and width of the circular heat conductor.

It is also possible to produce this moss and weed killer device from at least one rod-like heat conductor. It is advantageous to attach this heating rod spring-mounted and flexibly at its place of connection with the handle.

The weeds are burned and cut off by displacement of the rod-like heat conductor which is held parallel to the ground. The remainder of the plant in the joints or in the ground is burned off by sticking the heating rod into its roots.

This type of weed killing prevents rapid re-growth and is used with specific effects.

In a practical manner, the heat conductor is very simple to exchange. When displacing the heat conductor level with the surface which is covered with moss horizontally or vertically, the latter is burned off and separated from the surface.

This type of moss or weed killing leaves no traces on the flagstones and is environmentally compatible.

By means of the cutting and detaching device it is possible to burn or cut off the weeds or similar plants first with the horizontal, electrically heated rod for horizontal separation, and then to attack the deeper-seated portions of the plants with a vertical laser beam.

The heat conductor is advantageously angularly shaped and mounted near the ground on an undercarriage, and the line bisecting the angle of the heat conductor is oriented in the direction of travel. The angular heat conductor is fastened on a mount, which is resiliently fixed by means of a spring on a perpendicularly directed shaft in such a way that the line bisecting the angle can be laterally deflected and the heat conductor can pivot resiliently in two axial directions in case of obstacles.

The expansion difference of the heat conductor at various working temperatures is compensated by a mount connected to a spring, or by the disposition of a heat conductor mount capable of resilience. A roller body is disposed immediately ahead of the point of the angle of the heat conductor, by means of which irregularities in the terrain are compensated. If the roller body has an electrically heatable surface, it is assured that the center strip is also burned off. The heat conductor is located at a small distance from the upper edge of the terrain. When the heat conductor encounters a plant, the latter is cut off by burning it as closely as possible to the ground.

The cut materials are advantageously stored in a container or catcher by means of an air suction device.

For further burning of the closely cropped plant stubble and the plant roots between the joints, light amplified by stimulated emission of radiation (laser) is used. The exact area of use of the laser beam is measured by light beam sensors. The reflection-sensitive sensors determine the exact position of the plants. The detected places are irradiated with a concentrated greater portion of intensified light. In an advantageous manner the laser generator is equipped with a linear reflector. The pieces of plants burned off by the laser light are also conducted to a connected container or catcher by means of the suction device.

When the catcher is filled, it can be removed from the moss and weed killing device, because it is removably connected with the moss and weed killing device, and because it is provided with a pair of wheels, it can be easily pushed for unloading. During this operation the moss and weed killing device rests on the front wheel and the two supports of the catcher, which are embodied in the form of stands.

The cutting height can be set by set screws at the heat conductor mount, and the position of the laser reflectors can be set by means of additional set screws.

This type of thermal moss and weed killing does not leave any traces on the flagstones and is relatively environmentally compatible.

Exemplary embodiments of the invention are illustrated in the drawings and will be described in detail below.

DETAILED DESCRIPTION OF THE PREFERRED EMBODIMENTS(S)

The implement for lawn mowing, cutting and detaching moss and weeds and comminuting these mown and cut materials is provided with at least one electrical heat conductor (1) as the mowing, cutting, detaching and comminuting tool.

In an advantageous manner, this implement is embodied as a propelled lawn mower (2), a manually operated or propelled cutting and detaching device (3, 4) for moss or weeds and as a comminution container (5), which can be set up for the mown and cut materials.

Figure 1:
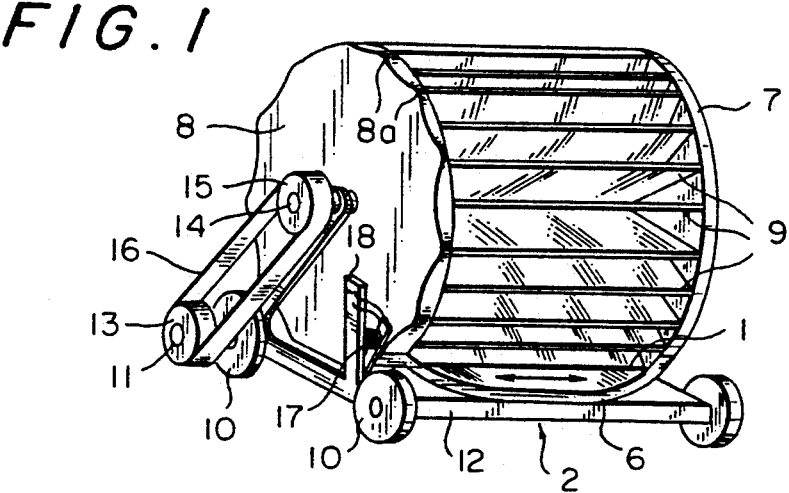
FIG. 1 a perspective view of a lawn mower.

The propelled lawn mower (2) (mowing device) shown in a perspective view in FIG. 1 has a wire-shaped heat conductor (1) disposed on a mount (6) in front of a vaned wheel (7). The vaned wheel (7), seated paraxially in respect to the heating wire (1) by means of radial vanes and representing the mower roller, has lateral circular cam plates (8) with wave-shaped control paths (8a), which are used for movement control of the heating wire (1) in the axial direction. The thermal expansion difference of the heat conductor (1) between the cold and poor stages is compensated by the disposition of a heat conductor mount (6) which is capable of resilience.

The heat conductor (1) is disposed at a short distance and parallel to the outer edges of the passing vanes (9) in such a way, that in the course of propelled operation all the materials to be mowed and located between the respectively arriving vane (9) and the heat conductor (1) are pressed against the heat conductor (1) and that the latter cuts them off by burning.

The lawn mower (2) has wheels (10) on both sides. Two of these wheels (10) are preferably disposed on a shaft (11), which is pivotably seated in the frame (12) of the lawn mower (2). Two drive wheels (13) which are only rotatable in one direction are disposed preferably on the ends of this shaft (11) in such a way, that both take over the task of driving the vaned wheel (7) with the cam plate (8). The shaft (14) of the vaned wheel (7) supports at least one toothed wheel (15), which turns the vaned wheel (7) respectively in one direction by means of a toothed belt (16). The vaned wheel (7) rotates in the course of the forward movement of the lawn mower (2), and an axial movement of the heat conductor mount (6) is generated by its wave-shaped circular cam plate (8). A spring (17) supports this movement and frictionally connects the heat conductor mount (6) with the cam plate (8) by pressing one against the other.

Figure 2:
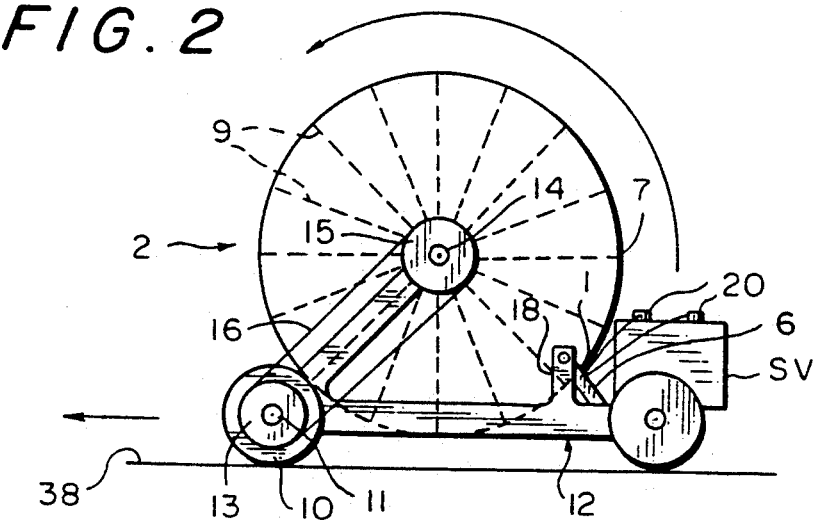
FIG. 2 a side view of the lawn mower.

FIG. 2 shows a side view of the lawn mower (2) with the vaned wheel (7) and its belt drive (13, 15, 16), which makes the driving connection to the wheels (10). The direction of movement of the mower device frame (12) and the direction of rotation of the vaned wheel (7) are shown by arrows. In this case the toothed belt (16) is advantageously connected with the front wheels (10). The height of the heat conductor mount (6) with the heating wire (1) determines the cutting height; it can be variably set in a known manner by arresting means in the lateral support arms (18).

Figure 3:
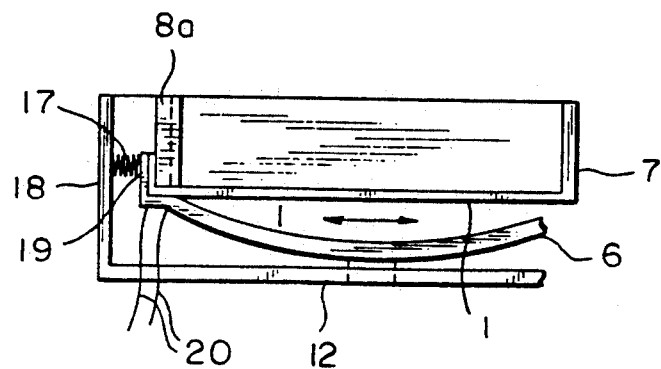
FIG. 3 a partial axial section through the roller with the heat conductor of the lawn mower, FIGS. 3a and 3b a side view and rear view of a lawn mower in a further embodiment, FIG. 4 a side view of a manually operated cutting and detaching device while enclosing a plant with a circular heat conductor, FIG. 5 a side view of the cutting and detaching device with the heat conductor guided in the joint, FIG. 6 a side view of the cutting and detaching device with the heat conductor adapted to vertical surfaces, FIG. 7 a side view of the cutting and detaching device with level guidance of the circular heat conductor, FIG. 8 a longitudinal section through the rod-shaped heat conductor of the cutting and detaching device and its connecting part, FIG. 9 a longitudinal section through the circular conductor of the cutting and detaching device and its connecting part, FIG. 10 a side view of the handle with removable battery of the cutting and detaching device, FIG. 11 a side view of a propelled cutting and detaching device with a catcher, FIG. 12 a side view of the device of FIG. 11 with the catcher removed, FIG. 13 a top view of the angular heat conductor of the device of FIGS. 12 and 13, which adapts itself to irregularities of the terrain, FIG. 14 a vertical section through a comminution container with heat conductor grid, FIG. 15 a section through a heat conductor of the heat conductor grid, FIG. 16 a top view of a further embodiment of the heat conductor grid.

FIG. 3 shows a portion of an axial section through the vaned wheels (7) with a top view of the heat conductor (1) and its mount (6). The heat conductor mount (6) can be seated in a slit in the shape of an elongated hole or the like on the frame (12) so it can be displaced transversely to the direction of travel. The wave-shaped cams (8a) disposed on the lateral cam plate (8) of the vaned wheel (7) are used for the axial movement of the heating wire (1) and its mount (6). The spring (17) supports a roller body (19) frictionally on the cam plate (8). The roller body (19) is fastened to the end of the heat conductor mount (6). The heat conductor (1) is easily exchanged, for which purpose it is clamped by its ends in contacts of the bow-shaped mount (6), from which the conductors (20) are brought to a current source (SV), for example a battery.

The axial heating wire movement can also be achieved by another known drive, possibly with a separate electric motor, instead of the cam drive.

Figure 3A:
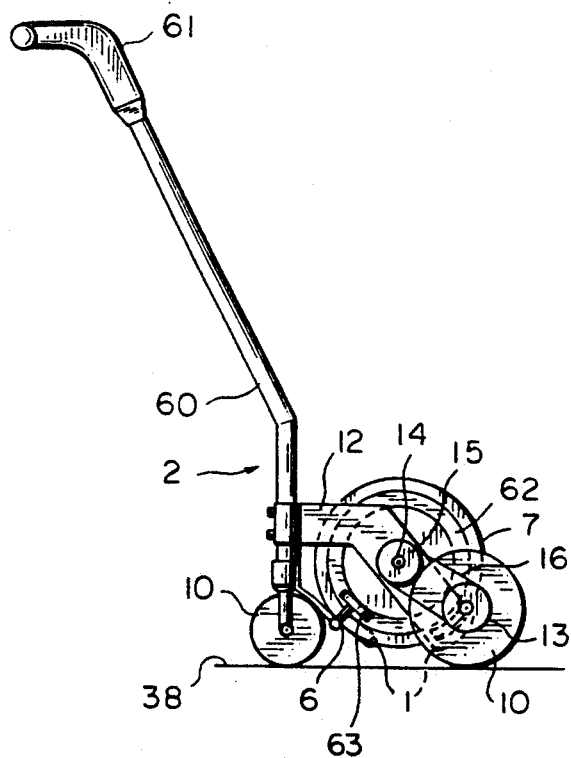
Figure 3B:
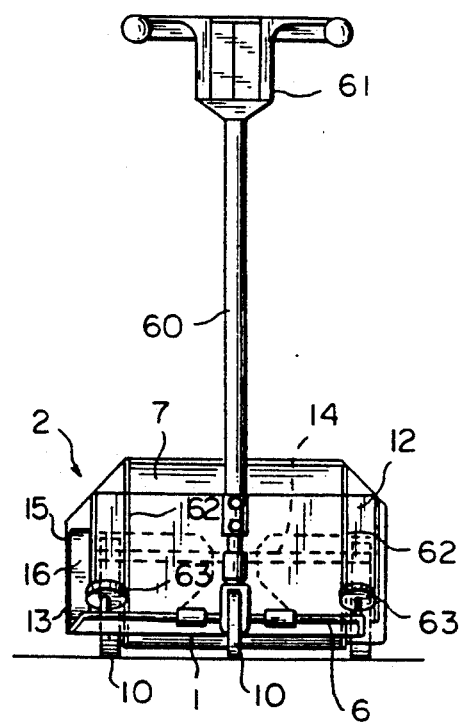

The lawn mower (2) shown in FIGS. 3a and 3b corresponds in its construction and its function to the lawn mower in accordance with FIGS. 1 to 3, and the same reference numerals will be used for like components.

The frame (12) is supported by four wheels (10), so it can travel, and has a manual guide lever (60) with a battery (61) and the operating levers on top.

The vaned wheel (7), seated rotatably around the shaft (16) in the frame (12) and driven by the drive (13, 15, 16) is embodied without a cam plate (8) and instead has a circular lateral race (62), in which the bow-shaped heat conductor mount (6) is supported on rollers (63).

The two rollers (63) are maximally disposed and/or guided elliptically, so that in the course of rolling in the race (62) they cause a lateral back-and forth displacement of the mount (6), extending crosswise to the direction of movement, and thus of the heat conductor (1).

Two mounts (6) with a heat conductor (1) each are assigned to the vaned wheel (7), which alternately act in either direction of travel of the lawn mower (2) and in the course of this are turned on or off automatically or by electrical switches.

These two heat conductors (1) are located at a distance from each other between the wheels (10) on the underside of the vaned wheel (7).

It is also possible for the vaned wheel (7) to be only equipped with rods on the periphery, instead of its plate-shaped vanes (9), which cooperate with the heat conductors (1) for mowing.

The heat conductor mounts (6) are displaceably connected with and resiliently seated on the frame (12).

Figure 4:
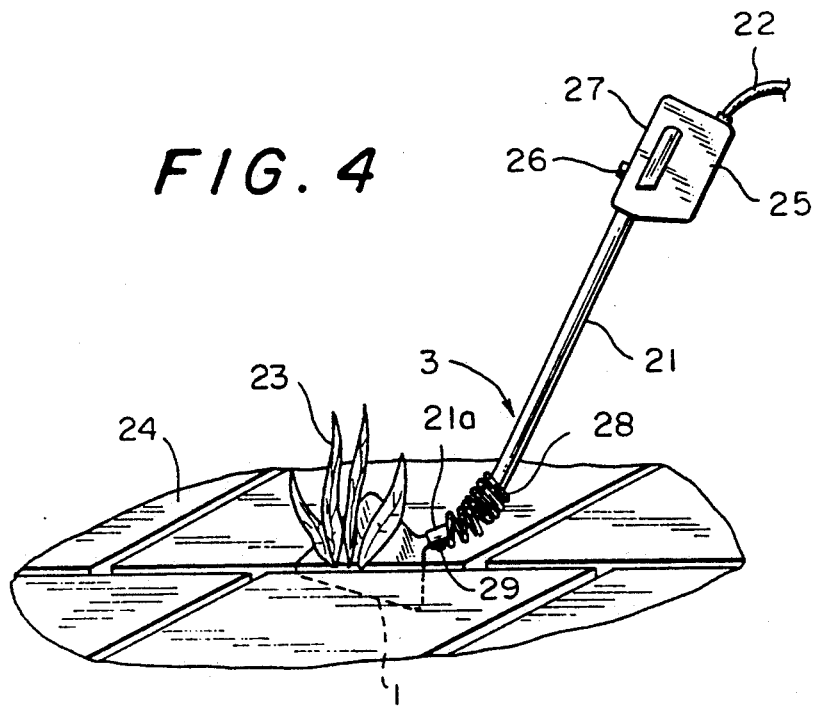

The manually operable cutting and detaching device (3) is illustrated in FIGS. 4 to 10. FIG. 4 is a side view of this device (3), with a guide rod (21) as a mounting and an electrical connection (22), encircling a plant (23) with a circular heat conductor (1) for the purpose of weed killing.

When the heat conductor (1) is displaced, the plant (23) is cut. The root remaining in the joints between flagstones (24) or cobbles can be burned off by inserting the heat conductor (1) even into narrow joints (24a).

A weak current generator i.e. transformer or a battery (25) and the switches (26) are on the handle (27) or somewhere in the electric cable (22).

This device is manually guided and can also be used for shortening of branches of plants.

In an advantageous manner, the length of the guide rod (21) of the moss and weed killer device (3) can be adjusted. This rod (21) is flexible in its length in an advantageous manner because of a radial division of the rod into a long rod (21) and a lower, short rod element (21a) and connection with a spring (28). The heat conductor (1) is connected relatively simply and exchangeably by screws (29) or in another removable way of fastening with the lower rod element (21a) of the rod (21).

Figure 5:
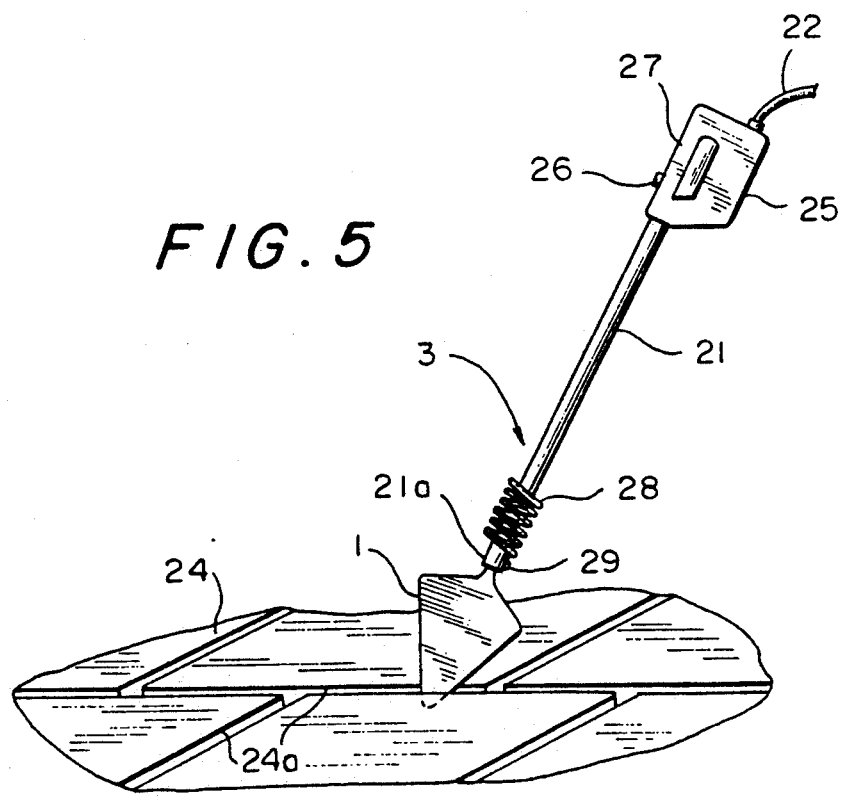

FIG. 5 is a side view of the cutting and detaching device (3) while being guided through a joint. The plant root and remainders which are in the joints (24a) and thin, slit-like gaps (24a) can be burned and damaged with it.

Figure 6:
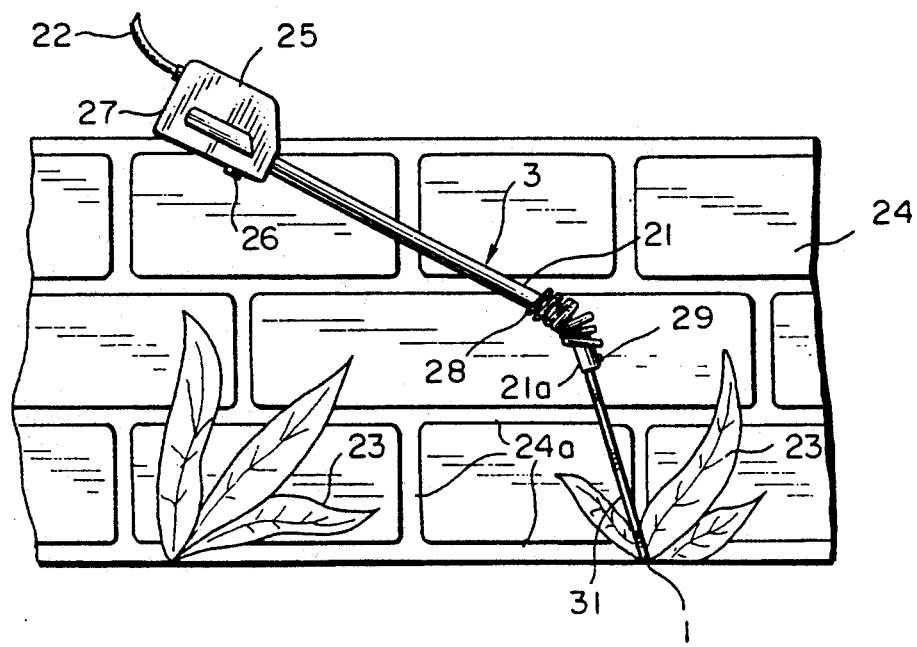

FIG. 6 shows the adaptation of the heat conductor (I) to irregularities, even of a perpendicular surface. Because the heat conductor (1) is easily guided, it can avoid obstacles and be adapted to every corner and edge and every angle. In addition, the rod (21) is axially flexible.

Figure 7:
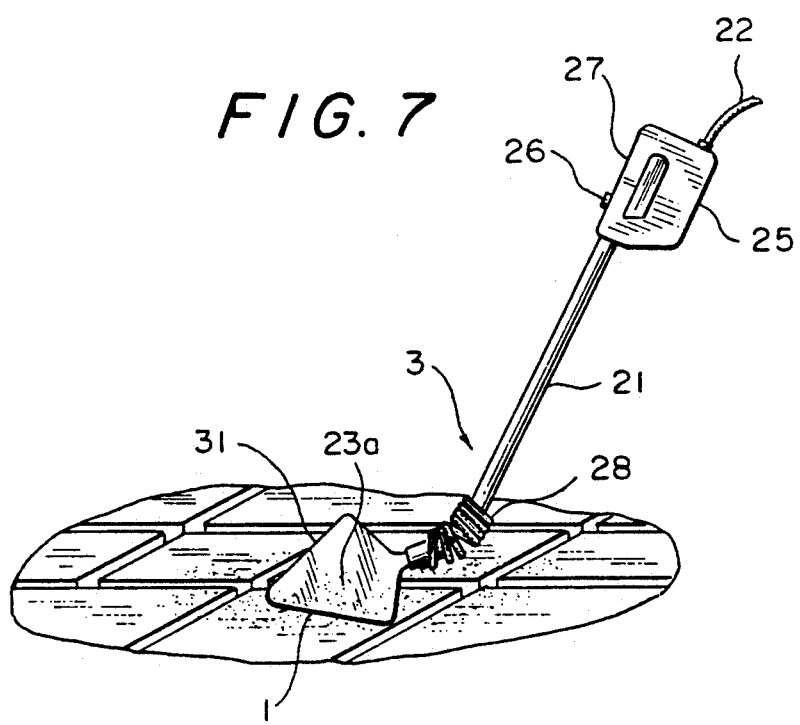

FIG. 7 shows the level guidance of the circular heat conductor (1) for the purpose of killing moss (23a).

This device (3) can also support an exchangeable rod-shaped or circular heat conductor (1).

The mode of operation is approximately the same in either case. By means of connection with a transformer (25), this device (3) can also be used on moist surfaces without there being a threat for the user on account of the electrical current.

Figure 10:
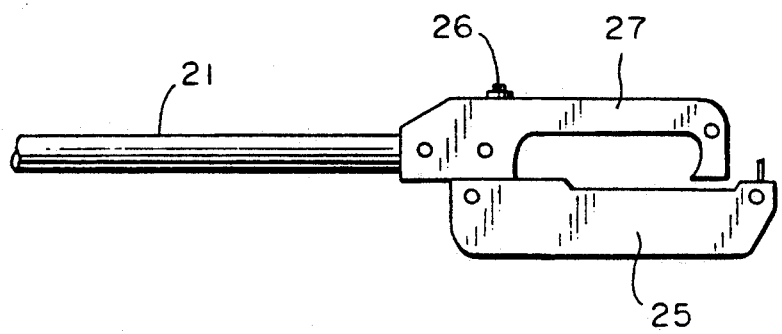

Because of its low energy consumption, the device (3) can also be operated by means of a battery (25) or other energy reservoir which, as shown in FIG. 10, is removably attached to the handle (27) and is removably fixed on the handle (27) and simultaneously electrically connected by a plug and arresting and sliding connector.

Figure 8:
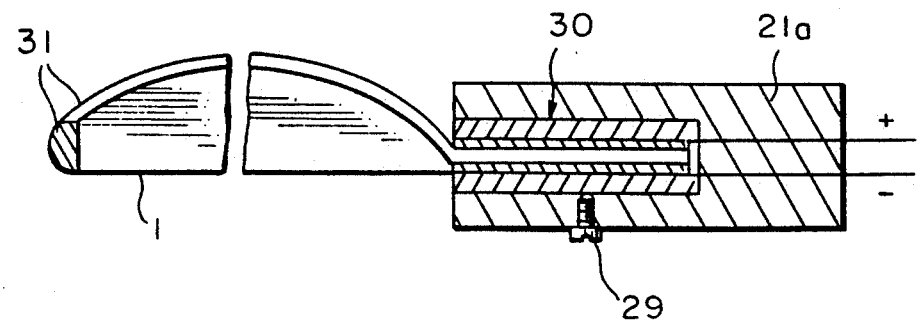

FIG. 8 shows a lateral section through the rod-shaped heat conductor (1) and its connecting element (30).

The expansion difference of the heat conductor (1) is compensated by the inclusion of a resilient expansion compensation mount (31).

After undoing a fastening screw (29), the heat conductor (1) and its resilient expansion compensation mount (31) with its connecting element (30) can be pulled out of the lower end (21a) of the guide rod (21) for exchange.

Figure 9:
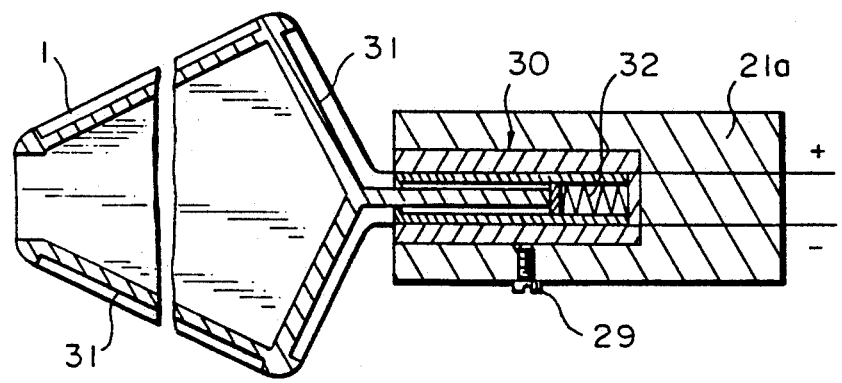

FIG. 9 shows a lateral section through the circular heat conductor (1) and its connecting element (30).

The spring (32) for expansion compensation of the heat conductor (1) and it mount (31) are advantageously embodied in the form of a plug-in component. This is removably fastened by means of a releasable fastening screw (29) at the lower end of the guide rod (21).

Figure 11:
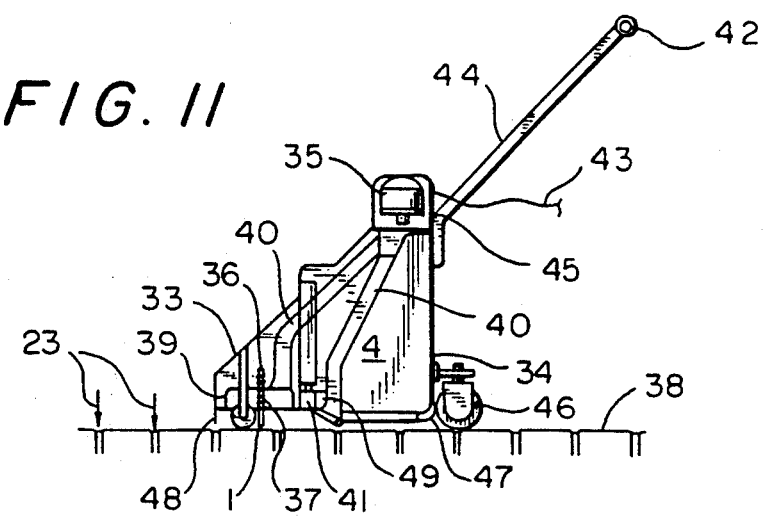
Figure 12:
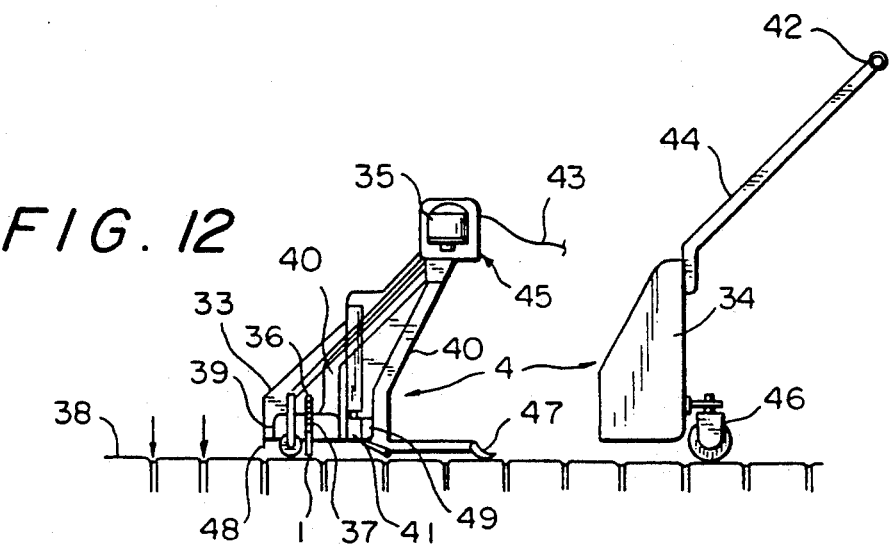
Figure 13:
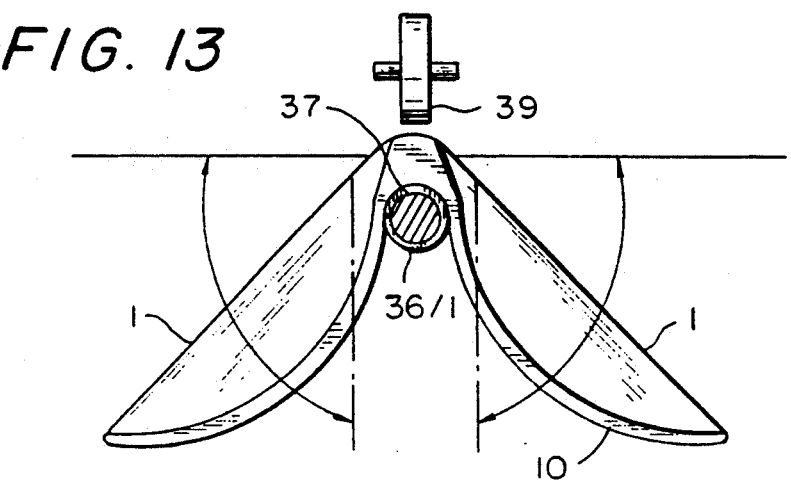

FIGS. 11 to 13 show the propelled cutting and detaching device (4).

The frame (13) of this device (4) has a removable catcher (34) and an electric drive (35).

A height-adjustable shaft (36) is disposed at the front of the frame (33) perpendicularly to the ground (38). Over its length, the shaft (36) is flexible because of a radial separation and a connection with a spring (37). The heat conductor (1) is connected at the lower end of the shaft (36) so it is relatively hard to pivot. The heat conductor (1) consists of two heating wires (1), which are connected at an angle, preferably at right angles, with each other.

The line bisecting the angle of the two heat conductors (1) is normally oriented in the direction of travel. When the heat conductors (1) are impeded by an irregularity in the terrain (28), the direction of the line bisecting the angle changes to avoid it. If the irregularity is in the front and perpendicular to the line bisecting the angle, a possibly driven roller (39) passes over it.

Laterally disposed suction tubes (40) conduct the cut materials into a catcher (34), which is removably connected with the frame (33).

To destroy the roots of the cut-off plants (23), a generator of light amplified by stimulated emission of radiation (laser) (41) acts on the roots between the joints of the flagstones at a defined setting following the cutting of the plants (23). An air suction tube (40) also conducts the plant or moss parts detached by the laser (41) into the catcher (34).

The electrical drive device (35) is used for generating the suction air and for driving the device (4). The electric switches (42) and electrical connections (43) are advantageously disposed on the manual guide lever (44). The electrical function of the switches (42) is linked with a catcher connecting lever (45). The electrical current is shut off when the catcher (34) is removed. The wheels (46) and the mounting levers (47) under the catcher (34), as well as the grating (48) to protect against rocks at the front of the device (4) are clearly visible in FIG. 12.

FIG. 12 is a lateral section through the propelled device (4) with the catcher (34) removed. The removably connected catcher (34) can be removed at one end from the frame (33) by the lever (45) at the upper portion of the catcher (34) and at the other end by a lever (47) at the lower end of the catcher (34), which can be pivoted by the foot, in the course of which the wheels (46) with the catcher (34) are rolled away from the frame (33). The frame (33) then rests on the front roller (39) and the two support anchors (47). Operation of the device (4) then is not possible because the catcher (34) with the wheels (46) and the manual guide lever (44) with the switch (42) is detached.

A beam detector (49) observes the place of impact of the laser light on the ground (38), the output signal of which controls the laser output. The beam detector (49) preferably is an infrared light detector, by means of which the burn temperature, which lies above 100 degrees C., is measured.

FIG. 13 shows the adaptation of the heat conductors (1) to the irregularities of the terrain (38). The right angle-shaped heat conductor (1) yieldingly adapts itself to the irregularities by pivoting.

In addition, the shaft (36) is axially flexible, so that perpendicular yielding is made possible when flagstone edges bump against the heat conductor (1).

To compensate for expansion differences of the heat conductor (1), the mount of the heat conductor (1) can be made of resilient material or provided with a spring.

Figure 14:
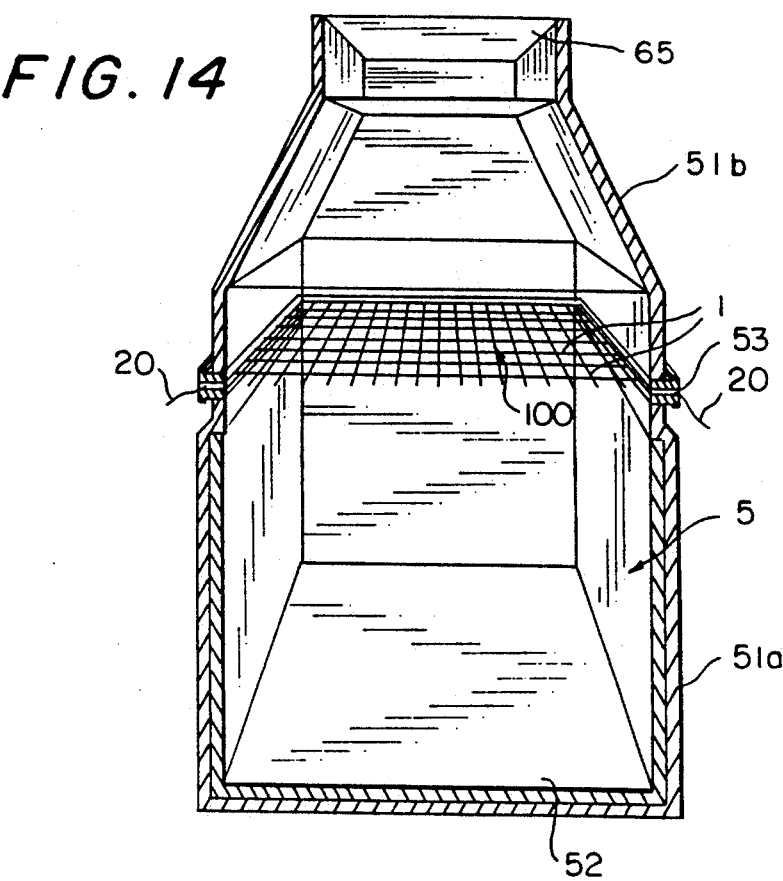

In FIG. 14 the comminution container (5) is shown in vertical section. This container (5) has a lower container portion (51a), into which a removable catcher (52) has been inserted.

The cut mown material is conducted through a top feed opening (65) of the container portion (51b) onto the heat conductor grid (100) made of heat conductors (1) stretched below it. A plurality of parallel and crossed heating wires (1) or rods (1) form the heat conductor grid (100). By turning on an electric switch, the heat conductor grid (100) is supplied with heat energy through a line-connected transformer or a battery.

The respectively already burned and cut mown material has lost a large portion of its weight because of evaporation of the liquid. The removably disposed lower catcher (52) for the cut materials can be removed for emptying from the container (5) in an advantageous manner.

The electrically heatable heating wires (1) or heating rods (1) are electrically connected by means of connecting lines (20) at their ends. The ends of the heat conductors (1) are each laterally maintained in the walls of the container (5) in an exchangeable frame (53) which has contact rails (57), each of which is connected on opposite sides with one of the connecting lines (20). The crossing groups of parallel heat conductors (1) are either spaced apart from each other at their intersecting points by means of insulators, for example glass bodies, or are disposed far enough on top of each other that electrical contact between the two crossing parallel conductor arrangements is impossible.

Figure 15:
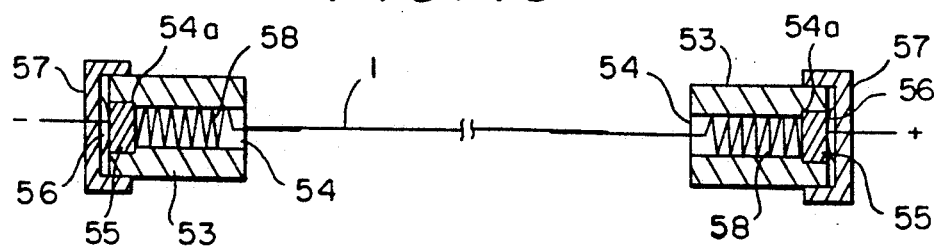

FIG. 15 shows a section through a heat conductor grid (100). Displacement of the individual heat conductors (1) or changes in the number of the parallel heat conductors (1) can be easily performed by means of their disposition in an undercut longitudinal slit (54) of the frame (53). The end of the heating wire (1) is maintained interlockingly displaceable in its undercut (54a) by a contact head (55). A pre-stressed contact spring (56) supports the contact head (55) against the contact rail (57). The changes in length of the heat conductor (1) at varying temperatures are compensated by means of a spring (58) inside the frame (53) and its slit (54).

The size of the heat conductor grid openings determines the size of the cut materials falling through there and their moisture reduction in connection with the burn output. The reduction in volume and weight of the compacted mown and cut waste materials also depends on this.

Figure 16:
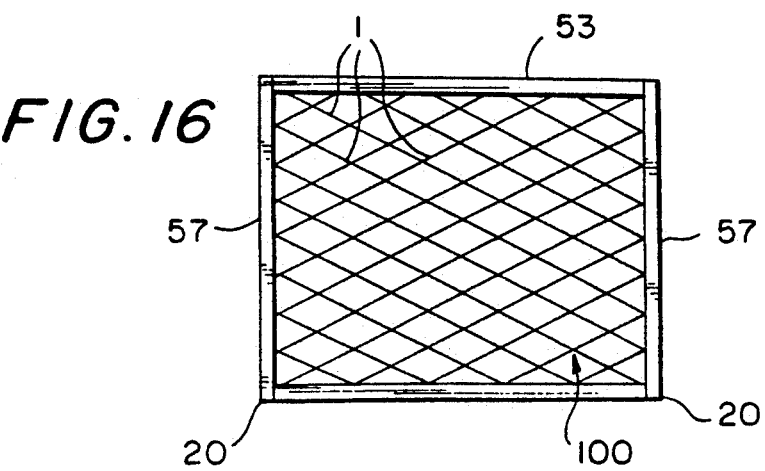

FIG. 16 shows a heat grid arrangement which is supplied with contact connectors (20) on only two opposite sides. In this heating grid (100) the heat conductors (1) extend respectively at angles of 45 and 135 degrees in relation to the extension device of the frame (53) and its contact rails (57) and in this way form the heating grid (100). The heat conductors (1) are mechanically and preferably also electrically connected with each other at the intersecting points; the heating grid (100) is preferably stamped from a sheet of resistance metal. Because the electrical paths to each intersection point are of the same length upstream as well as downstream, practically no electrical cross flow and the even heating of all wire sections takes place. In place of a preferred square heating grid (100) it is also possible to employ a rhomboidal one, in which the contact rails (57) are respectively located opposite each other in the direction of a diagonal of the rhombi or extend perpendicularly to it.

In an alternative way it is also possible to provide conductor arrangements which are asymmetrical in respect to the direction of extension, but where insulated linkage of the respectively adjacent conductors at the intersection points is necessary, because otherwise there would be an uneven current supply to the conductor sections.

The heat conductor corner points at the edges, looking in the direction of extension, are suitably suspended in the direction towards the frame (53) or insulatingly clamped there.

What is claimed is:

1. A manually operated cutting and detachment device comprising:
   a rod-shaped manual holder,
   a heat conductor,
   said heat conductor disposed on a heat conductor mount,
   said heat conductor mount disposed, with a fist spring interspersed, on a connecting part for compensating the expansion difference of said heat conductor at varying temperature,
   said connecting part with said heat conductor mount and said heat conductor disposed thereon being separably and exchangeably engaged to a first end of said rod-shaped manual holder, and
   electrical means engaged on a second end of said rod-shapen manual holder for generating electricity for resistance heating of said heat conductor.

2. The device according to claim 1, wherein said heat conductor is a loop and is resiliently and flexibly disposed on said heat conductor mount.

3. The device according to claim 1, wherein
   said rod-shaped manual holder comprises a first portion and a second portion shorter than said first portion.
   said first portion and said second portion joined together by a second spring,
   said connecting part being separably engaged to said second portion.

4. The device according to claim 1, wherein said electrical means is a battery separably mounted in a handle on said second end.

5. The device according to claim 1, wherein said electrical means ia a transformer mounted on a handle on said second end and connected to a cord for conducting electricity from a source of electricity.

6. The device according to claim 1, wherein said heat conductor mount is made from a solid rigid material.

7. The device according to claim 1, wherein said heat conductor mount is made of a resilient material which compensates the expansion difference of said heat conductor at varying temperatures.

* * * * *